United States Patent
Pfleger de Aguiar et al.

(10) Patent No.: US 10,841,332 B2
(45) Date of Patent: Nov. 17, 2020

(54) SYSTEM AND METHOD FOR PASSIVE ASSESSMENT OF INDUSTRIAL PERIMETER SECURITY

(71) Applicant: Siemens Aktiengesellschaft, Munich (DE)

(72) Inventors: Leandro Pfleger de Aguiar, Robbinsville, NJ (US); John W. Crawford, Cumming, GA (US); Tzu-hsin Tsao, Decatur, GA (US)

(73) Assignees: Siemens Industry, Inc., Alpharetta, GA (US); Siemens Corporation, Iselin, NJ (US)

( * ) Notice: Subject to any disclaimer, the term of this patent is extended or adjusted under 35 U.S.C. 154(b) by 248 days.

(21) Appl. No.: 16/061,989

(22) PCT Filed: Dec. 14, 2015

(86) PCT No.: PCT/US2015/065447
§ 371 (c)(1),
(2) Date: Jun. 13, 2018

(87) PCT Pub. No.: WO2017/105383
PCT Pub. Date: Jun. 22, 2017

(65) Prior Publication Data
US 2018/0367563 A1 Dec. 20, 2018

(51) Int. Cl.
*H04L 29/06* (2006.01)
*G06F 21/57* (2013.01)
*H04L 12/24* (2006.01)

(52) U.S. Cl.
CPC ........ *H04L 63/1433* (2013.01); *G06F 21/577* (2013.01); *H04L 41/12* (2013.01)

(58) Field of Classification Search
CPC ..... H04L 63/1433; H04L 29/06; H04L 41/08; G06F 21/577; H04B 10/116
See application file for complete search history.

(56) References Cited

U.S. PATENT DOCUMENTS 6,269,447 B1 * 7/2001 Maloney ............... G06F 3/14
726/25
6,535,227 B1 * 3/2003 Fox ......................... H04L 41/20
709/223

(Continued)

FOREIGN PATENT DOCUMENTS

| CN | 101682626 A | 3/2010 |
| WO | 2004031953 A1 | 4/2004 |
| WO | 2011155961 A2 | 12/2011 |

OTHER PUBLICATIONS

Cherdantseva Yulia et al: "A review of cyber security risk assessment methods for SCADA systems", Computers & Security, vol. 56, Oct. 13, 2015 (Oct. 13, 2015), pp. 1-27, XP029328740.

(Continued)

*Primary Examiner* — Hosuk Song

(57) ABSTRACT

A computer-implemented method for assessing and managing network security for a network includes retrieving topology data and network traffic data with a processor, where the topology data is indicative of a topology of the network. The method may further include retrieving, via the processor, network flow data from a plurality of network data collectors, generating, via the processor, an attack tree based on the topology data and the network flow data, updating a customer model database with the attack tree and the topology data, and outputting a security assessment based on the attack tree and the topology data.

17 Claims, 7 Drawing Sheets

(56) References Cited

U.S. PATENT DOCUMENTS

| | | | | |
|---|---|---|---|---|
| 6,952,779 B1* | 10/2005 | Cohen | ................... | G06F 21/577 |
| | | | | 726/22 |
| 7,013,395 B1* | 3/2006 | Swiler | ................. | H04L 63/1433 |
| | | | | 713/151 |
| 7,152,105 B2* | 12/2006 | McClure | ................. | H04L 41/12 |
| | | | | 709/224 |
| 7,194,769 B2* | 3/2007 | Lippmann | .............. | G06F 21/577 |
| | | | | 726/1 |
| 8,099,760 B2* | 1/2012 | Cohen | ................. | H04L 63/1433 |
| | | | | 726/2 |
| 8,239,951 B2* | 8/2012 | Lotem | ................. | H04L 63/1433 |
| | | | | 703/13 |
| 8,863,293 B2* | 10/2014 | Christodorescu | ....... | G06F 21/00 |
| | | | | 726/25 |
| 2010/0138925 A1 | 6/2010 | Barai et al. | | |

OTHER PUBLICATIONS

PCT International Search Report and Written Opinion of International Searching Authority dated Oct. 21, 2016 corresponding to PCT International Application No. PCT/US2015/065447 filed Dec. 14, 2015.

* cited by examiner

SYSTEM AND METHOD FOR PASSIVE ASSESSMENT OF INDUSTRIAL PERIMETER SECURITY

CROSS REFERENCE TO RELATED APPLICATIONS

This Application is the U.S. National Stage of International Application No. PCT/US2015/065447 filed 14 Dec. 2015 and claims benefit thereof, the entire content of which is hereby incorporated herein by reference.

BACKGROUND

The present disclosure relates to industrial security, and more specifically, to passive assessment of industrial perimeter security.

Industrial security service providers within industrial control system environments face multiple challenges in evaluating the quality of an adopted network security configuration. In particular, evaluating the quality of adopted access control lists (ACLs) within the network raises many challenges, which may not provide streamlined security assessments if not addressed properly. The challenge may arise because the quality of adopted ACLs may be observed differently at different network perimeters for different network zones. Collecting this information automatically poses many challenges. For example, industrial control system network environments typically include multiple layers of switches, routers, in a highly segregated environment thus requiring physical connection with each of layers for network traffic and configuration retrieval and recording. Probing techniques may be less than ideal, because industrial environments may include equipment that can be highly sensitive to active network probing. In some instances many installed legacy Programmable Logic Controllers (PLCs) operating in industrial environments can be highly susceptible to fault state errors resulting from the use of network discovery tools like network mappers (e.g., NMAP). Existing methods and devices for network security evaluation in industrial environments may offer no effective rule use validation and/or no correlation with state-of-the art attack vectors. In many cases, asset owners may simply opt for not having these activities performed as part of the network audit check process. Instead, they may focus purely in finding highly discrepant open network rules (e.g., "permit any", "permit IP," having no restriction on communications ports, etc.). However, an analysis may be highly dependent on discretion and experience of network security practitioners.

Manual assessments may be implemented as a matter of conventional strategy. Manual inspection and correlation of the applied ACLs to firewalls and multilayer packet processing devices by security analysts is a common adopted practice in many cases where only the offline configuration of the network device is provided. This approach may be limited to the security analyst's capabilities to read and process a large volume of network rules (in most cases). With increased human involvement and analysis, the option to validate ACLs against logged traffic manually may become tenuous and prone to errors.

Other conventional strategies for network security assessment may include use of automated off-the-shelf assessment tools. In general, existing automated tools can be divided in the following two categories: A first category of automated solutions may include firewall/switch/router configuration audit and compliance tools, which may be focused on collecting and processing the applied configuration against an internal knowledge base (KB) of security best practices. A second category may include firewall policy optimization tools, which may work as connected tools that leverage available information like routing tables, hit counts, and logs to provide historical traffic analysis and ruleset optimization. The evaluation of applied network rules against actual traffic is only possible in cases where the device is reachable by the audit server. In either case, conventional off-the-shelf firewall configuration audit tools often require a connection to the target network device. For example, connections through a firewall, industrial firewall, multilayer network switch, router, etc., may be problematic for evaluation of industrial control environments, in order to validate that the observed traffic corresponds to the configured ACL entries and that no "unused or excessively wide network rules" exist. In other cases, the network infrastructure and security configuration may be conventionally controlled by a third party IT Managed Services Provider (MSP) with a contractual obligation to restrict management access to its own staff. This may create difficulty in connecting through the various firewalls, multilayer network switches, routers, etc.

Conventional network security evaluation systems may also lack a mechanism to simulate the impact of recently disclosed vulnerabilities that are network exploitable considering the currently adopted security configuration. In other words, although both the information about the vulnerability and the (offline) firewall configuration may be available, there may not be any automated mechanism to correlate these and alert asset owners about new attack vectors that could potentially target existing valid ACLs to perform the attack. In addition to the problems noted above, an adoption of the "periodic firewall config audit" approach often exposes the attack surface of a controlled industrial networking environment. As the exposure increases, so does the attack vector and risk of malicious infiltration.

SUMMARY

According to some embodiments, a computer-implemented method for assessing and managing network security for a network is described. The method may include retrieving topology data and network traffic data with a processor, where the topology data is indicative of a topology of the network. The method may further include retrieving, via the processor, network flow data from a plurality of network data collectors, generating, via the processor, an attack tree based on the topology data and the network flow data, updating a customer model database with the attack tree and the topology data, and outputting a security assessment based on the attack tree and the topology data.

According to other embodiments, a system for assessing and managing network security for an industrial control system network is described. The system may include a processor configured to retrieve topology data and network traffic data, where the topology data is indicative of a topology of the network. The processor may be further configured to retrieve network flow data from a plurality of network data collectors, generate an attack tree based on the topology data and the network flow data, update a customer model database with the attack tree and the topology data, and output a security assessment based on the attack tree and the topology data.

According to other embodiments, a non-transitory computer-readable storage medium is described. The non-transitory computer-readable storage medium may be configured to store computer executable instructions that perform a method for assessing and managing an industrial control system network when executed by a processor. The method may include retrieving topology data and network traffic data with the processor, where the topology data is indicative of a topology of the network. The method may further include retrieving, via the processor, network flow data from a plurality of network data collectors, generating, via the processor, an attack tree based on the topology data and the network flow data, updating a customer model database with the attack tree and the topology data, and outputting a security assessment based on the attack tree and the topology data.

According to yet to other embodiments, a collector apparatus for collecting and storing network data flow information in a network is described. The collector apparatus may include a network interface configured to interface with a network routing device in the network, an LED communications light sensor configured to selectively receive, from an LED communications light transmitter, a communications signal from the network routing device indicative of the network data flow information, a computer memory operatively connected to the LED communications light sensor and configured to store the network data flow information, an output interface configured to transmit the stored network data flow information, and a hard switch in connection with the network interface and configured to selectively permit data to transmit from switch the LED communications light transmitter to the LED communications light sensor in one direction only.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
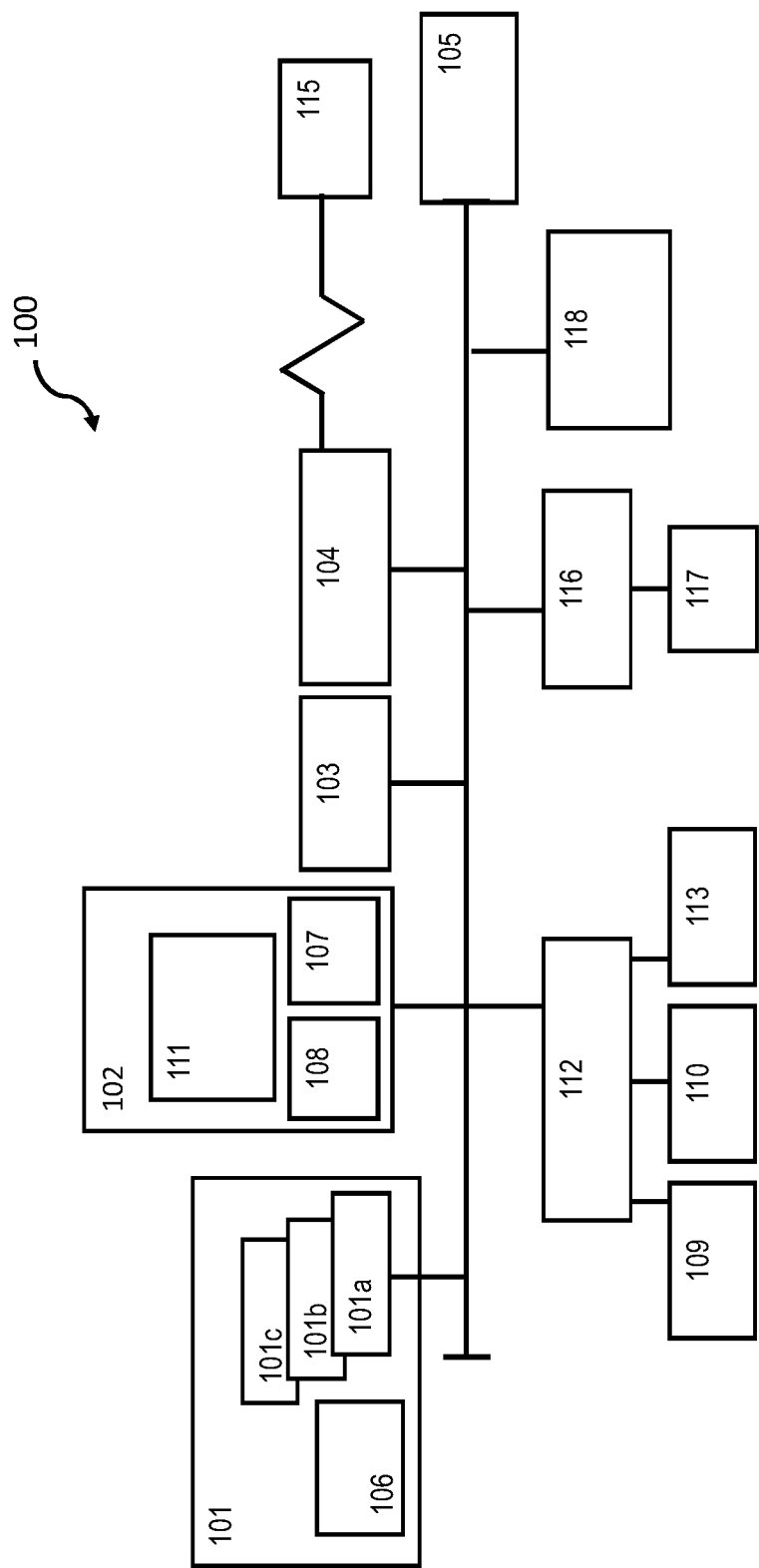
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices. Communications adaptor 104 may be operatively connect computer 100 to one or more networks 115. System bus 105 may also connect one or more user interfaces via interface adaptor 112. Interface adaptor 112 may connect a plurality of user interfaces to computer 100 including, for example, keyboard 109, mouse 110, speaker 113, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101a-101c, an auxiliary processor among several other processors associated with the computer 100, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 111. Operating system 111 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 113 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 115.

Network 115 can be an IP-based network for communication between computer 100 and any external device. Network 115 transmits and receives data between computer 100 and devices and/or systems external to computer 100. In an exemplary embodiment, network 115 can be a managed IP network administered by a service provider. Network 115 may be a network internal to an aircraft, such as, for example, an avionics network, etc. Network 115 may be implemented in a wireless fashion, e.g., using wireless protocols and technologies, such as WiFi, WiMax, etc. Network 115 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 111, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Figure 2:
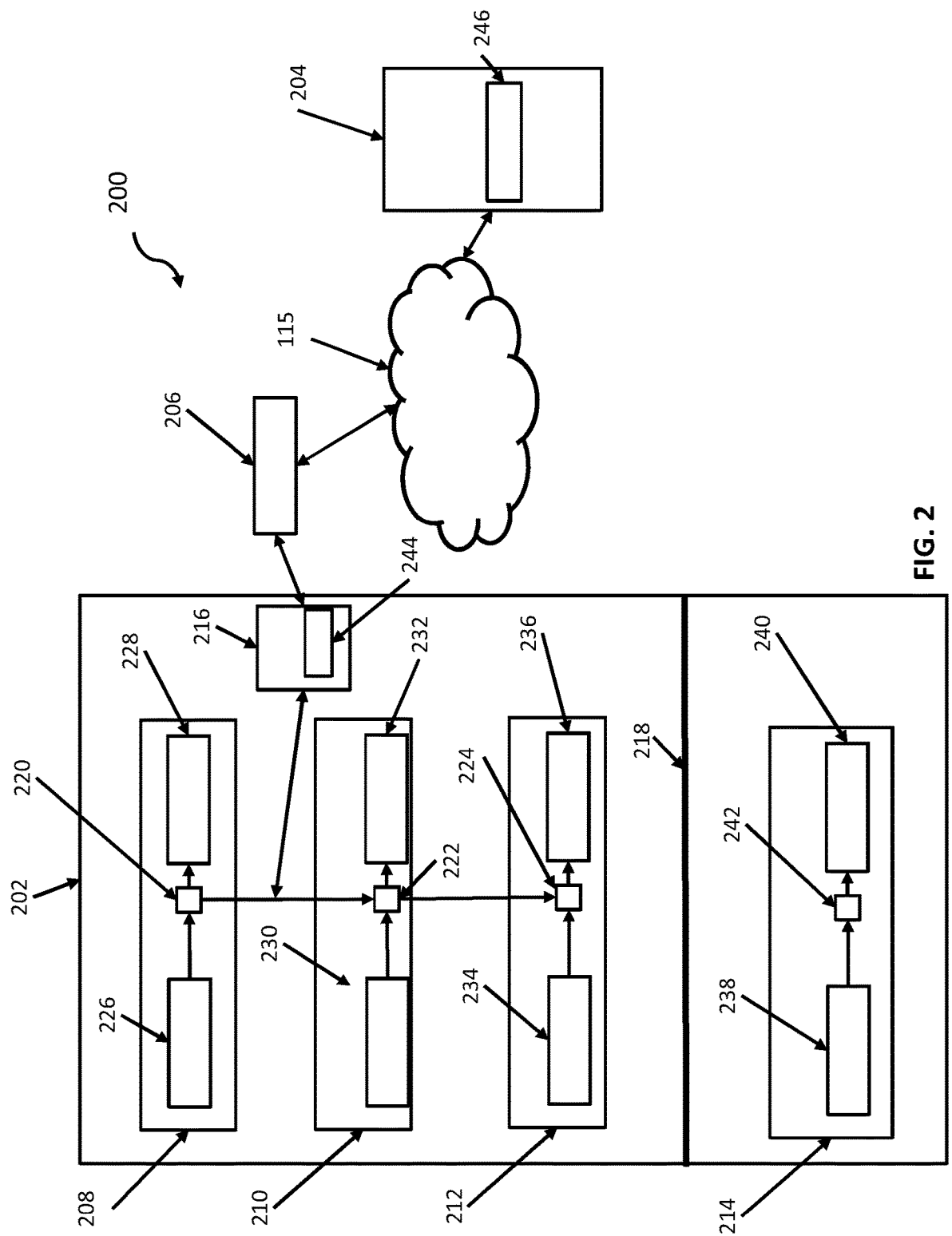
FIG. 2 depicts a computing environment for performing a method of passive assessment of industrial perimeter security in accordance with an exemplary embodiment.

Referring now to FIG. 2, an exemplary computing environment 200 for performing a method for network security of a network is described, in accordance with an exemplary embodiment. Computing environment 200 may include an industrial control systems network 202. Industrial network 202 may be operative operatively connected to a file server 204 via network 115. File server 204 may be a cloud-based platform, or a local file server. Industrial network 202 may be any type of network operating in an industrial environment, for example, in a manufacturing plant or other industrial environment. Industrial network 202 may include a mixture of industrial devices (e.g., devices 226, 230, 234, and 238), such as, for example, programmable logic controls (PLCs), HMIs (human-machine interface), field devices (sensor and actuators), personal computers, servers, network switches, routers, etc. Industrial network 202 may also include any one or more mobile devices, handheld devices, etc.

Industrial network 202 may include one or more network zones including, for example, industrial network zones 208, 210, 212, and 214. According to some embodiments, industrial network zones 208-214 may be interconnected via one or more switch/routers 220, 222, and 224. According to some embodiments, one or more zones may be isolated, such as industrial network zone 214. As shown in FIG. 2, industrial network zone 214 may be secluded or partitioned from the rest of industrial network 202 via one or more partitions 218, which may be physical disconnection from industrial network zones 208, 210, and/or 212, logical disconnection via VLANs (virtual LANs), or logical disconnection via a device such as, for example, a firewall (e.g., firewall 206). Although four zones are depicted in FIG. 2, it should be appreciated that any number of zones may be included and industrial network 202.

Industrial network zone 208 may include devices 226 connected to a network data collector 228 via switch/router 220. Any of industrial network zones 208, 210, 212, 214 may include a plurality devices (e.g., 226, 230, 234, and or 238). Switch/router's 220, 222, 224, and 242 may be interconnected or, in the case of zone 214, may be independent of the other zones.

Industrial network 202 may include one more client nodes 216, which may be used to isolate public networks, (e.g., network 115) from security enabled network environments). Client node 216 may include a client-side security module 244. Client-side security module 244 may include one or more tools, devices, and or drivers to communicate with and report to security assessment engine 246 operating on file server 204. File server 204 may include the security assessment engine 246. Security assessment engine 246, which is described in more detail with respect to FIG. 4, may include one or more engines configured to perform embodiments described herein.

As depicted in FIG. 2, industrial network zones 208, 210, 212, and/or 214 may each include one or more network data collectors (e.g., network data collectors 228, 232, 236 and 240). In some embodiments, network data collectors to 228, 232, 236, and 240, may be an off-the-shelf network information data collection tool such as a network mapping tool (NMAP) or other network packet capture tools. In other embodiments, network data collectors 228, 232, 236, and 240 may be one or more network collector apparatuses such as, for example, network data collector apparatus 300, as depicted with respect to FIGS. 3A and 3B. An isolated zone such as industrial network zone 214 may be isolated to prevent an attack vector through network 115 and/or anywhere within the other connected zones.

In some embodiments, off-the-shelf network information collection tools such as NMAPs may include utilities for network discovery and security auditing. In some aspects they may be configured to perform tasks such as, network inventory, managing network service upgrade schedules, network monitoring, host or service uptime information collection, and/or other network management and mapping tasks. NMAPs generally work by probing individual network assets and recording information learned by the network probes. In some aspects off-the-shelf network data collectors may use raw IP packet data in different ways to determine what network hosts may be available on the network. They may also determine services (for example applications and replication versions) that may be hosting specific network offerings. NMAPs may also determine operating system information such as operating system versions, device platforms, device types, hardware information and/or other information in connection with devices running on the network.

As previously described, industrial network environments may be highly sensitive to any mechanisms and/or techniques that perform active network probing (such as the automated tools described above) because installed devices such as older-model PLCs may be highly susceptible to entering into fault states after or during a network probing operation. In some situations, it may be advantageous to provide passive network data network data collectors that do not intrusively probe network assets.

Figure 3A:
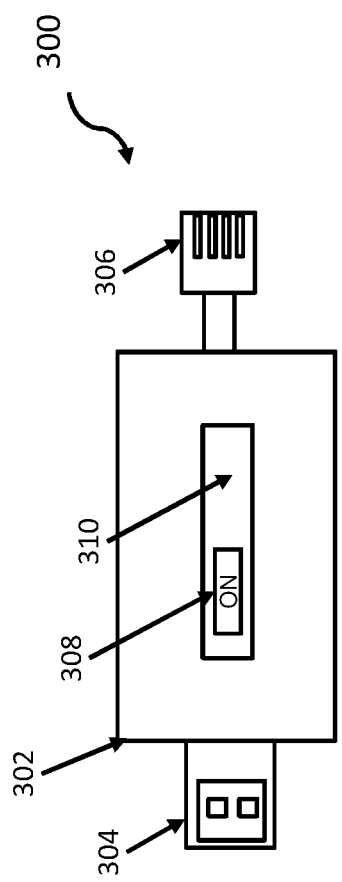
FIG. 3A depicts a passive network data collector in accordance with some embodiments.
Figure 3B:
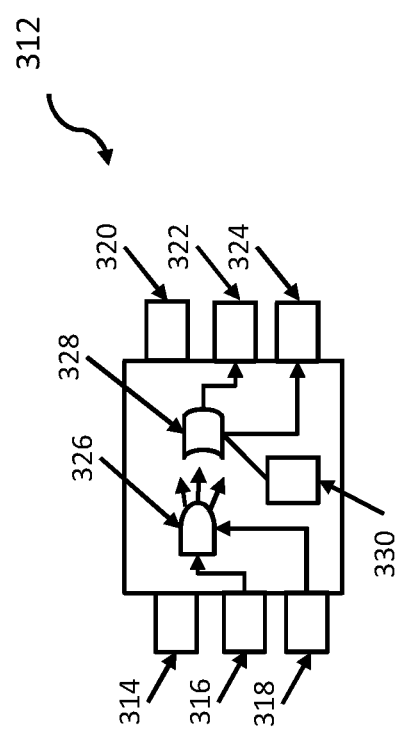
FIG. 3B depicts a systematic for exactly collector apparatus in accordance with an exemplary embodiment.

According to some embodiments, network data collectors 228, 232, 236, and 240 may be configured to passively collect information directly from network zones without intrusive probing operations. In some aspects collectors 228-240 may passively collect network information by observing local network traffic through the network infrastructure connected to each respective network data collector device. FIGS. 3A and 3B depict an exemplary passive network data collector device 300.

Referring now to FIG. 3A, an exemplary passive network data collector apparatus 300 is depicted, in accordance with some embodiments. In some aspects, network data collector apparatus 300 may include one or more USB interfaces 304, and/or one or more network interfaces 306. According to some embodiments, network interface 306 may be an RJ-45 connector or another network connector configured to interface with one or more network routers and/or network device (for example, switch/routers 220, 222, and/or 224). Passive network data collector apparatus 300 may be configured to interface with a network routing device via network interface 306.

In some aspects, network data collector apparatus 300 may receive information via USB interface 304, route information through one or more unidirectional couplings, process the information through one or more integrated memories, and output the information via network interface 306. In other aspects, network data collector apparatus 300 may receive packet capture information from the Ethernet and export the information via USB.

In other embodiments, network data collector apparatus 300 may collect traffic passively (via packet captures) using the Ethernet port, and export it to the central server and use it to validate the quality of the adopted ACLs in the perimeter. For example, according to some embodiments, there might be a TCP 502 port open on the perimeter, but no observed Modbus TCP traffic in the network using the device. The conclusion would be that, very likely, this port can be closed. Accordingly, network data collector apparatus 300 may be used for passive traffic collection and forensic information collection. In some aspects, network data collector apparatus 300 may be more secure than other network devices due to the fact that it does not allow malware to be propagated to and/or from network segments as it would be typically when using a simple USB storage media.

According to some embodiments network data collector apparatus 300 may allow information to pass in only one direction. By allowing information to flow in only one direction, one possible network attack vector may be eliminated. The information may be allowed through network data collector apparatus 300 by actuating a hard switch 308. As depicted in FIG. 3A, hard switch 308 is shown in the "on" position. Alternatively, hard switch 308 is switchable to an "off" position 310. In some aspects, when hard switch 308 is in the on position information, may not pass from USB interface 304 acting as an input to network interface 306 acting as an output.

According to other embodiments, network data collector apparatus 300 may include one or more mechanisms to ensure information only passed in one direction. Considering now FIG. 3B, systematic for an exemplary network data collector apparatus 300 is shown, according to some embodiments. Schematic 312 depicts pins 314, 316, 318, 320, 322, and 324. In some aspects, pin 314 may be configured to receive data input and/or power. Pin 316 may be configured as a ground pen, and pin 318 may be configured as an auxiliary data pin. Pins 316 and/or 318 may be configured to route data through one or more LED communications light transmitters 326. LED communications light transmitter 326 may transmit information in the form of light to one or more LEDs communications light sensor 328. According to some embodiments, LED communications light sensor 328 may be configured to route received information to an integrated device memory 330 and or one of signal pins, 320, 322 and/or 324. Although not shown in FIG. 3B, schematic 312 may include one or more microprocessors configured to process collected network data saved into and retrieved from memory 330. Memory 330 may store network data flow information that may be indicative of packet routing for a plurality of packets in a network. The information storable in memory 330 may also be indicative of one or more networking protocols previously used in the network, and one or more traffic patterns for the plurality of packets.

Embodiments and devices described herein may address some of the described gaps discussed above with respect to existing tools that provide network security assessments and industrial automation and control system networks. Conventional systems and devices are not currently non-intrusive and non-destructive to industrial networking operations, such as, for example, manufacturing. Accordingly, it may be advantageous to provide systems, and methods for online and off-line security verification and assessment.

Figure 4:
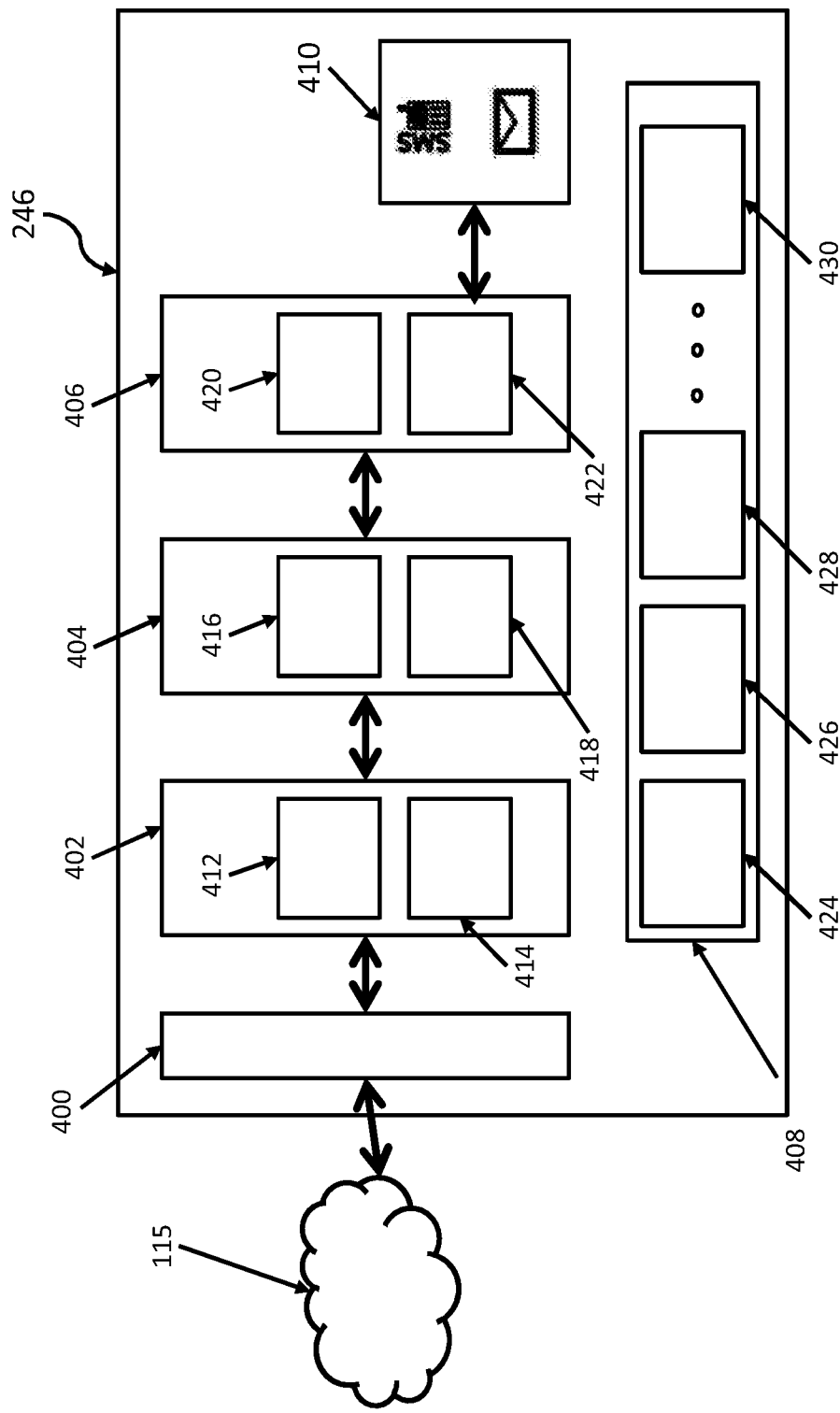
FIG. 4 depicts a security assessment engine in accordance with an exemplary embodiment.

FIG. 4 depicts security assessment engine 246, according to some exemplary embodiments. Security assessment engine 246 may be configured to derive risk models and network attack models based on collected network information. As previously discussed, the collective network information may include information collected off-line by clients devices or passive offline collection devices, or may be collected in real time using one or more network information collectors. Security assessment engine 246 may detect behavior anomalies based on information organized in the form of an attack risk simulation. In some instances, security assessment engine 246 may be configured to consider mitigation options (for example, closing ports, rerouting traffic, reset segmenting network internally with one or more levels, and/or other mitigation operations), and observe modeled outcomes of the network changes without actually committing the changes on an operational network. In some aspects, this may provide a way to anticipate and mitigate security risks (e.g., one or more potential exploits) without actually putting an operational computing environment at risk.

Security assessment engine 246 may include a parsing engine 400, an analytic engine 402, a model building engine 404, and a risk simulation engine 406. Parsing engine 400, analytic engine 402, and model building agent 404 may share information between the modules for the analyzing and creating security assessments, customer attack models and derived risk models. Security system engine 246 may further include customer notification engine 410, which may be configured to receive information from analytic engine 402 model building engine 404 and/or risk simulation engine 406, and alert one or more clients to a network security risk.

In some aspects, parsing engine 400 may be configured to receive network security and topology information from client-side security module 244 and one or more network information collectors (e.g., 228, 232, 236, and/or 240). For example, parsing engine 400 may receive one or more network logs, asset topology information and/or other network information, and parse the information for determination of relevant security risk information. Security assessment engine 246 may be configured to receive customer provided information including, for example, network packet capture files, zone descriptions for one or more zones where network traffic is collected, syslog information, SNMP information, asset inventory information, and/or network topology information. In other aspects, security assessment engine 246 may be configured to retrieve information automatically from one or more network appliances such as, for example, zone collectors, 228, 232, 236, and/or 240, client-side security module 244, and/or other network appliances, parse the information using parsing engine 400, and analyze the information using analytic engine 402. In other aspects security assessment engine 246 may receive information from external sources such as, for example, software product vulnerability information from software manufacturer websites, malware information, port targeting statistics, and or other sources of attack patterns, campaigns and/or open threat intelligence that it may be publicly available on the Internet, which may or may not be parsed by parsing engine 400.

Analytic engine 402 may be configured to provide continuous network monitoring and analysis based on network security and topology information received by parsing engine 400. For example, analytic engine 402 may analyze the information received by parsing engine 400, compute a baseline security profile based on the information, and provide online or off-line monitoring of industrial network 202 by comparing the security baseline with received network information. For example, analytic engine 402 may review known network information (e.g., topology information and packet flow information, etc.), and determine, based on changes in the known network information, whether any new or existing security threats exists on the network.

According to some embodiments, analytic engine 402 may further include a network flow analyzer 412 and a behavior anomaly detecting module 414. In some aspects, the network flow analyzer 412 may be configured to receive information from network data collectors 228, 232, 236, and/or 240 and analyze the collective network information with respect to network packet flow.

Behavioral anomaly detecting module 414 may be configured to detect anomalies from the collective network information that may be indicative of one or more security threats. For example, the collective network flow data may include information that indicates that a network attack that is in progress or a network attack was waged at a previous time. According to some embodiments, behavioral anomaly detection module 414 may be configured to perform deep packet inspection of industrial protocols (including, for example, Siemens proprietary protocols). In some aspects, anomaly detection module 414 may be configured to calculate a baseline security status based on the observed traffic pattern determined from collected information. Critical commands that may be security relevant can be collected and/or identified to provide behavioral detection in the collected network data. According to some embodiments analytic engine 402 may use this information to compute worst-case scenarios (for example, the impact) for analysis and assertion of calculated risks.

Model building engine 404 may include an attack tree computation engine 416 and a threat information collector 418. In some aspects, attack tree computation engine 416 may analyze security threats detected by analytic engine 402 with respect to one or more network topologies received by and parsed by parsing engine 400. Attack tree computation engine 416 may formulate one or more attack trees that may be indicative of potential or actual security risks identified for a particular network based on collected network security configuration (e.g. ACLs). In some aspects analytic engine 402 may identify emerging risks based on external network changes (for example, a recently discovered malware) that may be relevant to the attack model. Where existing tools may focus on intangible insights of a network (such as, for example, a list of operating systems included within the network), analytic engine 402 may utilize actual network information determined in real time in connection with emerging network attack information.

In some aspects, customer notification engine 410 may be configured to alert clients about potential negative impacts of security threats, and provide recommendations and instructions for mitigating risks detected and analyzed via risk detection and calculation module 420. For example customer notation engine 410 may be configured to provide risk alerts for any newly discovered attack pattern that may apply to a customer environment (for example, industrial network 202). Threat information collector 418 may aggregate threat information learned from public sources including the Internet, and private sources including analytic engine 402. Flow analyzer 412 may forward mitigation recommendations to one or more clients that may include recommended network topologies or flow redirect changes.

In some aspects, security assessment engine 246 may observe an abnormal and/or critical configuration or command existing in industrial network 202 that may be indicative of a heightened security threat. Accordingly, security assessment engine 246 may provide recommended security configuration and/or optimization recommendation to a client via customer notification engine 410. A recommendation may include, for example, a network setting recommendation, a transport layer setting, and/or an application layer setting.

Figure 5:
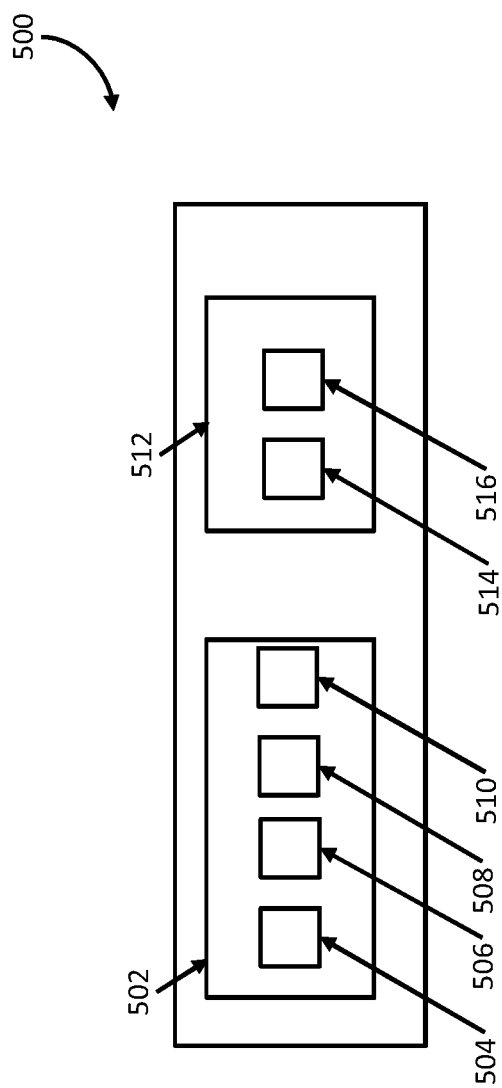
FIG. 5 depicts a customer risk model in accordance with an exemplary embodiment.

According to other embodiments, security assessment engine 246 may include a customer model database 408. Customer model database 408 may include one or more customer risk models such as, for example, customer risk models 424, 426, 428, 430, etc. Although only four customer risk models are depicted in FIG. 4. It should be appreciated that security assessment engine 246 may include any number of customer risk models. FIG. 5 depicts an exemplary customer risk model 500, according to some example embodiments.

Referring now to FIG. 5, customer risk model 500 may include a plant network security model 502 and an attack tree information data structure 512. According to some embodiments, network security model 502 may include a plurality of data structures including, for example, a traffic flow information structure 504, a network zone security information structure 506, an attack vector information structure 508, and a configuration recommendation record 510. According to other embodiments, customer risk model 500 may further include an attack information record 512 which may include a protocol use record 514, and/or a network credential attack path information structure 516. Customer model database 408 may include individual customer risk models (for example customer risk model 500) corresponding to a plurality of clients having networks such as, for example, industrial network 202.

Figure 6:
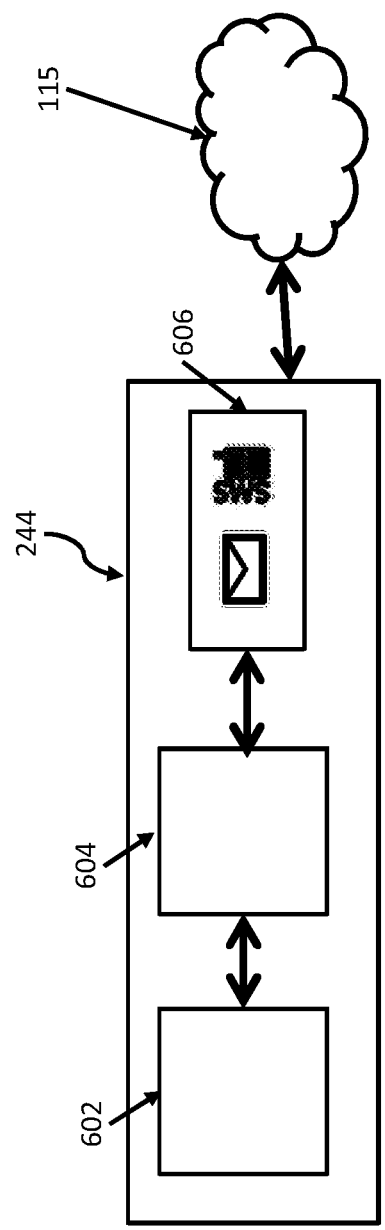
FIG. 6 depicts a client-side security engine model in accordance with an exemplary embodiment.

As previously explained, security assessment engine 246 may be operatively installed on file server 204. In some aspects, client-side security module 244 may be operatively installed on client node 216. Referring now to FIG. 6, client-side security module 244 is depicted, according to some exemplary embodiments. Client-side security module 244 may include a collector aggregation engine 602, a network topology engine 604, and a customer notification module 606.

Collector aggregation engine 602 may be configured to collect network information from collectors to 28, 232, 236, and/or 240. In other embodiments, network topology engine 604 may be configured to collect and/or aggregate a network topology for network devices, such as, for example, devices in industrial network zones 208, 210, 212, and/or 214. Network topology engine 604 may collect and aggregate network topology information by querying network data collectors 228, 232, 236, and/or 240. According to some embodiments network data collectors 228, 232, 236, and 240 may be networked computer systems. In other aspects, the network collectors may be one or more independent collector apparatuses, such as, for example, network data collector apparatus 300. Accordingly, network data collectors 228, 232, 236, and/or 240 may be physically connected to client node 216 via switch/router 220, and/or be directly connected to client node 216 via USB interface 304 and/or network interface 306. Customer notification module 606 may receive and/or transmit client notifications to and from file server 204.

Figure 7:
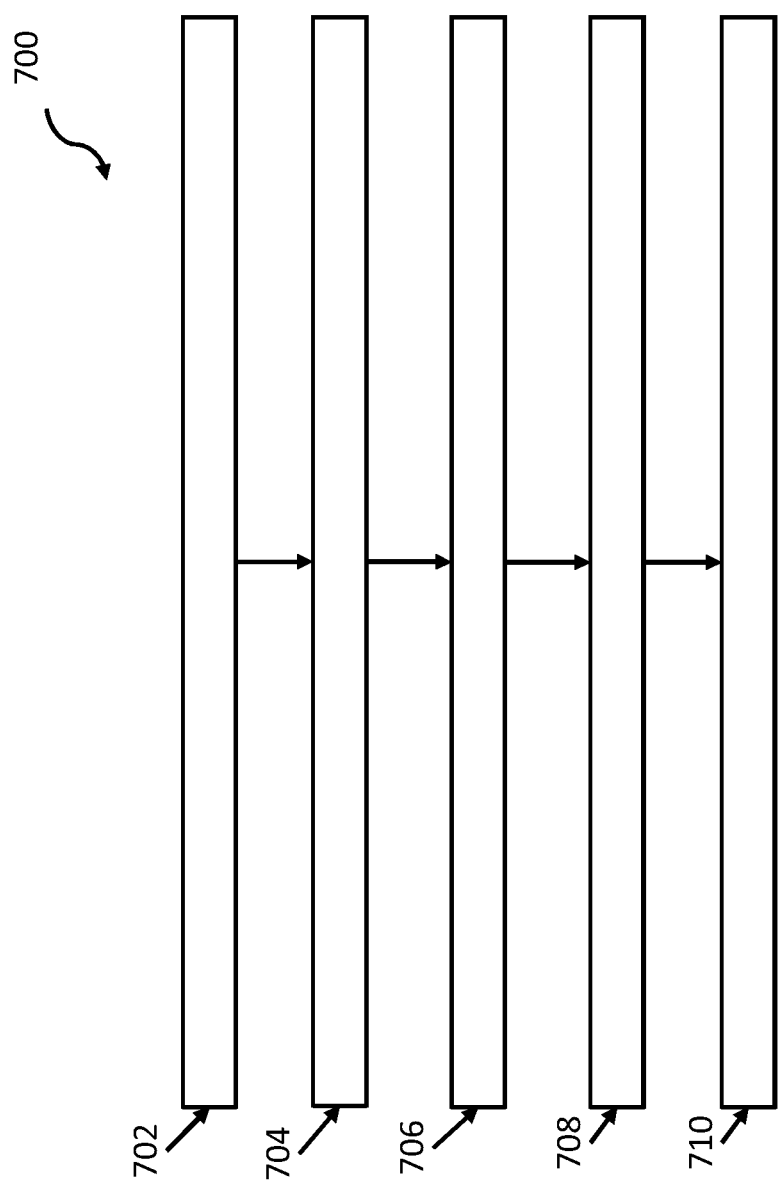
FIG. 7 depicts a method for network security management in accordance with an exemplary embodiment.

Referring to FIG. 7, a method for network security management 700 is depicted, according to some exemplary embodiments. According to some embodiments, security assessment engine 246 may be configured to maximize the value of security and assessment results provided by clients via client side security module 244 via one or more passive network data collection devices (e.g., passive network data collection device, 300), and/or data automatically retrieved by the system in a nonintrusive and nondestructive way. Security assessment engine 246 may be configured to provide online and online verification of a security profile for one or more industrial networks (e.g., industrial network 202). For example, security assessment engine 246 may be configured to access and/or receive information from one or more packet capturing tools of a client's choosing. In other embodiments, security assessment engine 246 may be configured to observe and monitor network traffic using one or more network traffic capture devices such as, for example, network data collector apparatus 300.

Referring now to block 702, in some aspects, security assessment engine 246 may retrieve network topology data from client-side security module 244. The network topology data may be indicative of every device on a network (for example, industrial network 202) including, for example, PLCs, routers, switches, servers, wireless access points (APs), printers, VoIP phones, desktops, mobile devices, etc. The topology information may further include network credential information, network segmentation information, and/or other router information. Topology data may also include information in connection with all network nodes. The role of each particular note IP addresses associated with network devices and/or connection settings for each of the network devices. Topology data may further include a network map showing representations of each of the devices.

Security assessment engine 246 may next retrieve network security data from a plurality of network data collectors, as shown at block 704. Network security data may include packet forwarding rules, which may work in conjunction with known network resources to support load-balancing, protocol forwarding, secure routing, and rule specific network forwarding operations. Each of one or more rules may match particular IP address, a protocol, and optionally ranges ports to secure target pools or target instances. The traffic is sent to an external IP address that may be served by a rule, according to some embodiments for forwarding rules may direct traffic to one or more corresponding targets.

In some aspects, network data collectors 228, 232, 236 and 240 may receive network information, including, for example, network path packet capture files and zone descriptions indicative of how and where network traffic data is collected, syslog information, SNMP information, network and plant asset information, network inventory information (e.g. software inventory) and/or network topology information (for example, zone and conduit information with respect to industrial network 202).

In some aspects, security assessment engine 246 may prompt for user input, where a user inputs the requested security data. In other aspects, security assessment engine 246 may access the zone collector information through network 115, or in the case of zone collectors being a passive network data collection device, (e.g., passive network data collection device, 300), security assessment engine 246 may contact a client node (e.g., client node 216) which may be operatively connected to the collectors.

Accordingly, security assessment engine 246 may then access the information saved on each collector, and analyze the customer provided input and combine the customer provided input with information automatically or manually collected by the system. For example, software product vulnerability information, malware information, port lists and status information, targeting statistics, and/or other information indicative of sources of attack patterns. Attack sources may include known attack campaigns from internally-known intelligence and/or publicly available intelligence information that may be available from online and other sources.

As shown is at block 706, security assessment engine 246 may generate an attack tree based on the topology data and network security data. Some aspects of tech trees may include one or more conceptual diagrams that show how an asset target or other network device may be attacked by malicious malware, an individual actor, etc. For example, in an attack tree may be used to describe threats on computer systems and identify aspects of particular node. In some embodiments, tech trees may be a multilevel diagram system one route leaves and children. The bottom of child nodes may generally be conditions which are satisfied to make the direct parent no true. For example, what are the satisfied, the attack may be complete. Each node may be satisfied only by its direct child node. Attack trees may become very complex, especially when dealing with specific types of attacks. For example, for tax treatment contain hundreds or even thousands of different paths all leading to completion of one or more attacks. The tech trees may be useful for determining what threat levels exist for particular network assets, and how to deal with them in the most effective manner.

According to some embodiments, security assessment engine 246 may review the topology data, parse the topology data in conjunction with the forwarding rules associated with each node of the network, and generate an attack tree based on the topology data in the network security data. As shown at block 708 security assessment engine 246 may update one or more customer model databases using the security data. For example, customer model database 408 may include a plurality of customer risk models 424-430. Each of the customer risk models may include client-specific information with respect to network topology, attack tree information, network security data, etc. According to other embodiments security system engine 246 may also update one or more customer risk models with one or more custom alerts with respect to a client's network environment (for example, industrial network 202). In other aspects, customer risk models may further include cut one or more custom mitigation rules which may be indicative of one or more tasks for mitigating a particular risk identified by security assessment engine 246.

According to some embodiments, generating an attack tree may also include modeling one or more proposed detection rules, which may be performed by risk and risk simulation engine 406. Risk and simulation engine 406 may include a risk detection and calculation module 420 and a risk mitigation simulation engine 422. In some aspects, risk detection and calculation module 420 may detect a node having one or more risk factors, and assign a particular risk probability for each node determined in a network topology. Stated another way, each node of the topology data may intrinsically have a relatively higher or lower risk as an attack vector. In some embodiments, the attack tree and/or topology data may include each respective risk probability for a node. Accordingly, risk mitigation simulation engine 422 may simulate one or more mitigation plans by modeling a network rezoning instance, a traffic redirection, or other network changes to determine any possible negative impacts of any of the changes proposed.

In some aspects, customer notification module 606 may provide an alert of a simulated risk or an actual observed risk. As shown in block 710, security assessment engine 246 may have put one or more security assessments. Security assessments may include, for example, risk alerts for each newly discovered attack pattern applicable to one or more customer environments (for example, one or more customer risk models 428-430). Security assessments may further include one or more mitigation recommendations for the network topology and/or flow redirect changes with respect to operational impact of any one or more changes. Security assessments may also include any abnormal and/or observed critical configuration commands that have been manually changed by network security personnel. Finally, security assessments may include one or more security optimization recommendations (for example, a network, transport, and or application layer change recommendation).

According to some embodiments, security assessment engine 246 may provide a framework for one or more clients to access known attack vector information with respect to their own industrial network environment, and/or industrial network environments of one or more other clients. For example, if one client utilizing security assessment engine 246 determines a particular network threat of their own network security assessment in 246 may note in the customer database that particular threat, and share information learned about that particular threat with one or more other customers utilizing security assessment engine 246. Security assessment engine 246 may retrieve network topology information with respect to particular network, retrieve the network security data in the in the information from network data collectors, generate one or more attack trees based on the learned information and network data collectors and or security data, and update a customer model database (for example, a customer risk model) with the learned information. In other aspects security assessment at 246 may share anonymized information with one or more other customers in order to leverage known security assessment information between customers. In some aspects, one or more customers may access security system engine 246 on a subscription basis through network 115 and/or by other means.

Security assessment engine 246 may be configured to provide continuous alerting for network security risks. Accordingly, security assessment engine 246 may provide a security baseline for a client infrastructure based on one or more network routing rules and configurations, actively compare the rules and/or configurations to collective security intelligence information, and make determinations regarding any applicable threats present in industrial network 202.

In other aspects, security assessment engine 246 may monitor traffic patterns by considering the packet information and/or off-line verification information provided by the client-provided off-line verification tools. Security assessment engine 246 may also determine a security status based on the observed traffic. Security assessment engine 246 may provide model based risk detection based on client provided attacked models and/or a hierarchy of network graphs automatically determined by the system. In some aspects, security assessment engine 246 may identify emerging risks based on one or more internal and/or external changes.

According to some embodiments, security assessment engine 246 may utilize client-provided and system-collected information to provide intermediate outputs that can include, for example, plant network security model information (e.g., applicable attack trees), risk alerts for each of the discovered attack patterns, mitigation recommendations for configuring network topologies and or redirecting network flow observations regarding abnormal and/or critical configurations, and network optimization recommendations for general network operability.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for assessing and managing network security for a network, comprising:
retrieving topology data and network traffic data with a processor, wherein the topology data is indicative of a topology of the network;
retrieving, via the processor, network flow data from a plurality of network data collectors;
generating, via the processor, an attack tree based on the topology data and the network flow data;
updating a customer model database with the attack tree and the topology data; and
outputting a security assessment based on the attack tree and the topology data,
wherein generating the attack tree comprises:

parsing, via the processor, the topology data and the network flow data to determine a plurality of potential exploits in the network;

parsing the network flow data, via the processor, to determine one or more network rules associated with a plurality of nodes in the topology of the network;

calculating, via the processor, a risk probability associated with the plurality of potential exploits based on the one or more network rules and network flow data; and generating the attack tree based on the one or more network rules and the network flow data, wherein the attack tree comprises the plurality of potential exploits and the risk probability associated with the plurality of potential exploits.

2. The computer-implemented method of claim 1, wherein retrieving the topology data comprises receiving the topology data from a collector apparatus.

3. The computer-implemented method of claim 1, wherein retrieving the topology data comprises transmitting a prompt for user input of the topology data and receiving the topology data from a client responsive to the prompt.

4. The computer-implemented method of claim 1, wherein updating the customer model database comprises:
   updating, via the processor, a customer risk model record with the plurality of potential exploits in the network, the risk probability associated with the plurality of potential exploits, and the attack tree.

5. The computer-implemented method of claim 1, wherein outputting the security assessment comprises:
   determining, via the processor, a risk mitigation recommendation comprising at least one recommended step for configuring the network.

6. The computer-implemented method of claim 1, wherein outputting the security assessment further comprises:
   monitoring the network, via the processor, to determine whether one or more network configurations is indicative of a heightened network security risk.

7. A system for assessing and managing network security for an industrial control system network comprising:
   a processor configured to:
      retrieve topology data and network traffic data, wherein the topology data is indicative of a topology of the network;
      retrieve network flow data from a plurality of network data collectors;
      generate an attack tree based on the topology data and the network flow data;
      update a customer model database with the attack tree and the topology data; and
      output a security assessment based on the attack tree and the topology data
   wherein generating the attack tree comprises:
   parsing, via the processor, the topology data and the network flow data to determine a plurality of potential exploits in the network;
   parsing the network flow data via the processor to determine one or more network rules associated with a plurality of nodes in the topology of the network;
   calculating, via the processor, a risk probability associated with the plurality of potential exploits based on the one or more network rules and network flow data; and
   generating the attack tree based on the one or more network rules and the network flow data, wherein the attack tree comprises the plurality of potential exploits and the risk probability associated with the plurality of potential exploits.

8. The system of claim 7, wherein retrieving topology data comprises transmitting a prompt for user input of the topology data and receiving the topology data from a client responsive to the prompt.

9. The system of claim 7, wherein retrieving topology data comprises receiving the topology data from a collector apparatus.

10. The system of claim 7, wherein updating the customer model database comprises:
    updating, via the processor, a customer risk model record with the plurality of potential exploits in the network, the risk probability associated with the plurality of potential exploits, and the attack tree.

11. The system of claim 7, wherein outputting the security assessment comprises:
    determining, via the processor, a risk mitigation recommendation comprising at least one recommended step for configuring the network.

12. The system of claim 7, wherein outputting the security assessment further comprises:
    monitoring the network, via the processor, to determine whether one or more network configurations is indicative of a heightened network security risk.

13. A non-transitory computer-readable storage medium configured to store computer executable instructions that perform a method for assessing and managing an industrial control system network when executed by a processor, the method comprising:
    retrieving topology data with a processor, wherein the topology data is indicative of a topology of a network;
    retrieving, via the processor, network flow data from a plurality of network data collectors;
    generating, via the processor, an attack tree based on the topology data and the network flow data;
    updating a customer model database with the attack tree and the topology data; and
    outputting a security assessment based on the attack tree and the topology data,
    wherein generating the attack tree comprises:
    parsing, via the processor, the topology data and the network flow data to determine a plurality of potential exploits in the network;
    parsing the network flow data via the processor to determine one or more network rules associated with a plurality of nodes in the topology of the network;
    calculating, via the processor, a risk probability associated with the plurality of potential exploits based on the one or more network rules and network flow data; and
    generating the attack tree based on the one or more network rules and the network flow data, wherein the attack tree comprises the plurality of potential exploits and the risk probability associated with the plurality of potential exploits.

14. The non-transitory computer-readable storage medium of claim 13, wherein retrieving the topology data comprises transmitting a prompt for user input of the topology data and receiving the topology data from a client responsive to the prompt.

15. The non-transitory computer-readable storage medium of claim 13, wherein retrieving the topology data comprises receiving the topology data from a collector apparatus.

16. The non-transitory computer-readable storage medium of claim 13, wherein updating the customer model database comprises:
    updating, via the processor, a customer risk model record with the plurality of potential exploits in the network, the risk probability associated with the plurality of potential exploits, and the attack tree.

17. The non-transitory computer-readable storage medium of claim 13, wherein outputting the security assessment comprises:
   determining, via the processor, a risk mitigation recommendation comprising at least one recommended step for configuring the network.

\* \* \* \* \*